United States Patent
Courteville et al.

(10) Patent No.: US 9,404,752 B2
(45) Date of Patent: Aug. 2, 2016

(54) METHOD FOR PROCESSING A FLIGHT PLAN IN A FLIGHT MANAGEMENT SYSTEM

(71) Applicant: THALES, Neuilly-sur-Seine (FR)

(72) Inventors: Romain Courteville, Valence (FR); Bertrand Barnetche, Valence (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 13/950,701

(22) Filed: Jul. 25, 2013

(65) Prior Publication Data

US 2014/0032107 A1    Jan. 30, 2014

(30) Foreign Application Priority Data

Jul. 27, 2012  (FR) .................................... 12 02125

(51) Int. Cl.
| | |
|---|---|
| *G08G 5/00* | (2006.01) |
| *G01C 21/00* | (2006.01) |
| *G06Q 10/04* | (2012.01) |

(52) U.S. Cl.
CPC .............. *G01C 21/00* (2013.01); *G06Q 10/047* (2013.01); *G08G 5/0034* (2013.01)

(58) Field of Classification Search
CPC ... G05D 1/0202; G05D 1/0204; G05D 1/042; G05D 1/044; G05D 1/046; G05D 1/067; G05D 1/10; G05D 1/101; G05D 1/102; G05D 1/104; G05D 1/105; G05D 1/0044; G08G 5/003; G08G 5/0034; G08G 5/0039; G08G 5/0047; G08G 5/0052; G01C 23/005

USPC .............. 701/3, 4, 14, 25, 26, 120, 467, 528, 701/529; 340/973, 979

See application file for complete search history.

(56) References Cited

U.S. PATENT DOCUMENTS

| | | | |
|---|---|---|---|
| 4,692,869 A * | 9/1987 | King et al. ..................... 701/467 |
| 4,774,670 A * | 9/1988 | Palmieri ............................ 701/3 |
| 6,856,864 B1* | 2/2005 | Gibbs et al. ....................... 701/3 |
| 7,194,353 B1* | 3/2007 | Baldwin et al. ............... 701/528 |
| 7,965,202 B1* | 6/2011 | Chiew et al. .................. 340/974 |
| 8,744,747 B1* | 6/2014 | Bailey et al. .................. 701/408 |
| 2004/0015274 A1* | 1/2004 | Wilkins et al. ..................... 701/3 |
| 2005/0137758 A1* | 6/2005 | He et al. ............................. 701/3 |
| 2005/0192717 A1* | 9/2005 | Tafs et al. .......................... 701/3 |
| 2006/0273928 A1* | 12/2006 | Van Boven .................. 340/945 |
| 2007/0067095 A1* | 3/2007 | King .............................. 701/206 |
| 2007/0150178 A1* | 6/2007 | Fortier .......................... 701/206 |
| 2007/0219678 A1 | 9/2007 | Coulmeau |
| 2007/0219679 A1* | 9/2007 | Coulmeau ......................... 701/3 |

(Continued)

FOREIGN PATENT DOCUMENTS

| | | | |
|---|---|---|---|
| FR | 2870372 A1 | 11/2005 |
| FR | 2898672 A1 | 9/2007 |

(Continued)

*Primary Examiner* — Thomas Tarcza
*Assistant Examiner* — Richard Goldman
(74) *Attorney, Agent, or Firm* — Baker & Hostetler LLP

(57) ABSTRACT

A method for processing a flight plan, implemented in a flight management system, consisting of at least one segment, comprises a step of determining the positions of the start point and of the end point of each of said segments constituting said flight plan by searching for at least two characteristic points of said segment, said characteristic points being explicit, fixed and non-floating, said positions being respectively characterized by a latitude, a longitude and an altitude.

9 Claims, 4 Drawing Sheets

(56) References Cited

U.S. PATENT DOCUMENTS

| | | |
|---|---|---|
| 2007/0233331 A1 | 10/2007 | Caillaud |
| 2008/0027629 A1* | 1/2008 | Peyrucain et al. ............ 701/206 |
| 2008/0103645 A1* | 5/2008 | DeMers et al. ................. 701/14 |
| 2008/0125960 A1* | 5/2008 | Wipplinger et al. .......... 701/200 |
| 2008/0154490 A1* | 6/2008 | Hoofd et al. ................... 701/202 |
| 2008/0177431 A1 | 7/2008 | Coulmeau et al. |
| 2008/0183343 A1* | 7/2008 | Brent et al. ........................ 701/3 |
| 2008/0243314 A1* | 10/2008 | Ridenour ............................ 701/7 |
| 2009/0005967 A1* | 1/2009 | Rumbo et al. ................... 701/202 |
| 2009/0082955 A1 | 3/2009 | Sacle et al. |
| 2009/0177342 A1 | 7/2009 | Gutierrez-Castaneda |
| 2010/0004798 A1* | 1/2010 | Bodin et al. ...................... 701/2 |
| 2010/0030404 A1* | 2/2010 | Berard ............................ 701/14 |
| 2010/0161153 A1* | 6/2010 | Corfman .......................... 701/3 |
| 2010/0211312 A1* | 8/2010 | Ginsberg ....................... 701/209 |
| 2010/0286859 A1* | 11/2010 | Feigh et al. ..................... 701/25 |
| 2010/0324812 A1* | 12/2010 | Sacle et al. .................... 701/206 |
| 2010/0332123 A1* | 12/2010 | Filias et al. ................... 701/206 |
| 2011/0276201 A1* | 11/2011 | Block ................................ 701/9 |
| 2012/0010765 A1* | 1/2012 | Wilson et al. .................... 701/3 |
| 2012/0083946 A1* | 4/2012 | Maldonado et al. ............. 701/3 |
| 2012/0179368 A1* | 7/2012 | Walter ........................... 701/465 |
| 2012/0215384 A1* | 8/2012 | Fritz ................................ 701/2 |
| 2012/0253562 A1* | 10/2012 | Wachenheim et al. ........... 701/4 |
| 2013/0006450 A1* | 1/2013 | Del Amo Blanco et al. ... 701/14 |
| 2014/0012436 A1* | 1/2014 | Coulmeau et al. ................ 701/3 |
| 2014/0032019 A1* | 1/2014 | Courteville et al. .............. 701/3 |
| 2014/0032105 A1* | 1/2014 | Kolbe et al. ................... 701/528 |
| 2014/0032107 A1* | 1/2014 | Courteville et al. .......... 701/528 |
| 2014/0067267 A1* | 3/2014 | Kolbe et al. ................... 701/533 |
| 2014/0081569 A1* | 3/2014 | Agrawal et al. ............... 701/467 |
| 2014/0257684 A1* | 9/2014 | Wilder et al. ................. 701/121 |

FOREIGN PATENT DOCUMENTS

| | | |
|---|---|---|
| FR | 2898673 A1 | 9/2007 |
| FR | 2909460 A1 | 6/2008 |
| FR | 2916287 A1 | 11/2008 |
| FR | 2926156 A1 | 7/2009 |

* cited by examiner

METHOD FOR PROCESSING A FLIGHT PLAN IN A FLIGHT MANAGEMENT SYSTEM

CROSS-REFERENCE TO RELATED APPLICATIONS

This application claims priority to foreign French patent application No. FR 1202125, filed on Jul. 27, 2012.

FIELD OF THE INVENTION

The invention applies to the field of the flight management systems (FMS) embedded in aircraft. The aim of these systems is, for example, to assist the pilot during the flight by supplying in particular information on the piloting, the navigation, the estimation of the outside environmental parameters, fuel consumption. The invention applies more particularly to the definition of the flight plan, its transcription into the form of a trajectory for an aircraft and its possible change during the flight.

BACKGROUND

A flight plan is made up of a set of flight path segments of different types. These different types of segments are, for example, defined in the Arinc 424 standard. In the case of this standard, the segments are as follows:

The IF (Initial Fix) segment, which is defined by a fixed initial point on the ground.

The CF (Course To a Fix) segment, which is defined by a trajectory joining then following a route on the ground to reach a fixed point.

The DF (Direct to a fix) segment, which is defined by a trajectory to a fixed point. This trajectory is not necessarily straight, in fact the aircraft seeks in this type of segment to reach the point of arrival without necessarily following a straight line. Thus, in the event an offset induced, for example, by a maneuver or by a cross wind, this offset is not compensated.

The TF (Track between two fixes) segment, which is defined by a great circle route between two fixed points. A great circle route designates the shortest path between two points of a sphere, that is to say the great circle arc which passes through these two points. The difference between a segment of DF type and a TF segment is represented in FIG. 1.

The AF (Arc DME to a Fix) segment, which is defined by a circular arc of determined radius whose center is a beacon or radio transmitter of "DME" (Distance Measuring Equipment) type.

The RF (Radius to a Fix) segment, which is defined by a circular arc, of determined center and radius. This circular arc is in addition implemented between two fixed points. The description of this segment also includes a direction of travel to determine which of the two possible circular arcs must be chosen.

The VI (Heading to intercept) segment, which is defined by a heading to be followed to the intersection with the next segment. The heading is the angle between North (geographic or magnetic) and the fuselage of the airplane. In practice, the heading is given by a compass present in the aircraft. Air related legislation, such as the United States Federal Aviation Regulations (FARs), demands the presence of a compass in an aircraft.

The CI (Course to Intercept) segment, which is defined by a route to be followed to the intersection with the next segment. The route is the angle between North (geographic or magnetic) and the speed vector of the airplane. Determining the route means having to know the movement of the airplane relative to the ground. In practice, this implies the presence of a satellite positioning system, for example equipment of GPS (Global Positioning System) type or equipment of Galileo type, or the presence of a system of inertial type, in the aircraft. Air legislation does not demand the presence of a satellite positioning system or of a system of inertial type in an aircraft, which is why the flight plans are described mainly by using segments defined by a heading rather than segments defined by a route, to be compatible with the older aircraft or aircraft not equipped with a satellite positioning system or a system of inertial type.

The VA (Heading to Altitude) segment which is defined by a heading to be followed to a given altitude.

The CA (Course to Altitude) segment, which is defined by a route to be followed to a given altitude.

The FA (Fix to Altitude) segment, which is defined by a route to be followed, starting from a fixed point and to a given altitude.

The VD (Heading to DME Distance) segment, which is defined by a heading to be followed to the intersection with a circular arc whose center is a beacon or a radio transmitter of "DME" type.

The CD (Course to DME Distance) segment, which is defined by a route to be followed to the intersection with a circular arc whose center is a beacon or a radio transmitter of "DME" type.

The VR (Heading to Radial) segment, which is defined by a heading to be followed to the intersection with a specified radial (a radial corresponds to a straight line starting from a point and forming a determined angle with geographic North).

The CR (Course to Radial) segment, which is defined by a route to be followed to the intersection with a specified radial (a radial corresponds to a straight line starting from a point and forming a determined angle with geographic North).

The FC (Track from Fix to Distance) segment, which is defined by a route starting from a point that is explicitly defined, in a database, by its coordinates of latitude/longitude/altitude type and having a specific duration.

The FD (Track from Fix to DME Distance) segment, which is defined by a route starting from a point that is explicitly defined, in a database, by its coordinates of latitude/longitude/altitude type and finishing at the intersection with a circular arc whose center is a beacon or a radio transmitter of "DME" type.

The VM (Heading to Manual) segment, which is defined by a heading. The end of this segment is determined by the pilot and it is not therefore known in advance.

The FM (Fix to Manual) segment, which is defined by a route starting from a point that is explicitly defined, in a database, by its coordinates of latitude/longitude/altitude type. The end of this segment is determined by the pilot and it is not therefore known in advance.

The HA segment, which is defined by a portion of circuit in the form of a race-track pattern, the end of which depends on the altitude.

The HF segment, which is defined by a circuit in the form of a race-track pattern implemented during a single turn.

The HM segment, which is defined by a circuit in the form of a race-track pattern with no exit condition, upon manual activation.

The PI (Procedure Intercept) segment, which is defined by a route moving away from a fixed point then a half-turn and finally a route having an intersection with the next segment. Note that the Arinc 424 standard allows this type of segment to be followed only by segments of CF type. These segments of CF type have the characteristics of having a final point corresponding to the initial point of the segment of PI type and of having a route corresponding to the opposite of the route of the segment of PI type.

When transcribing the flight plan into a trajectory, it is necessary to take account of all of the transitions of the flight plan. A transition is a trajectory element that links two segments together in a flyable manner. Now, the algorithm for determining the trajectory of the airplane during a transition depends on the type of the two segments of the transition. In the case of the Arinc 424 standard, this standard has 23 different segment types. There are therefore potentially 529 transition combinations, and consequently 529 different algorithms. In practice, the Arinc 424 standard defines a certain number of restrictions and interdictions in the transitions between segments, which makes it possible to reduce the number of combinations. Nevertheless, for operational needs, some cases prohibited by the Arinc 424 standard sometimes have to be implemented by the FMS because they correspond to a real need of the crew. Furthermore, the data present in the databases are not always perfect and many particular cases can occur and require specific management. The implementation of all these algorithms means that the flight plan transcription system is highly complex. This high complexity notably has impacts during the flight plan transcription system validation process. In practice, because of the large number of algorithms implemented, the tests carried out during the validation process cannot be exhaustive and therefore risk not reflecting all the transition conditions. The system obtained as described above therefore risks not being reliable and provoking failures that can be critical.

Furthermore, in the case of changes to the Arinc 424 standard, or to adapt the transcription of the flight plan to the inclusion of a new standard, it is necessary to modify all of the flight plan transcription algorithms. In particular, it is necessary to modify the algorithms that make it possible to determine the trajectory of the aeroplane during the transitions. This complexity results in a significant financial cost for the development of the modifications of the algorithm.

SUMMARY OF THE INVENTION

The object of the present invention is therefore a method that makes it possible to limit the complexity of the flight plan transcription algorithms. The method of the invention also makes it possible to easily adapt the flight plan transcription algorithms in the case of a modification of the Arinc 424 standard or of the use of another flight plan segment description standard.

There is proposed, according to one aspect of the invention, a method, implemented in a flight management system, for processing a flight plan consisting of a plurality of segments. This method comprises a step of determining the positions of the start point and of the end point of each of the segments constituting the flight plan by searching for two characteristic points of the segment. The characteristic points are explicit, fixed and non-floating (e.g., non-moving, not continually drifting and/or not changing position). The positions of the start and end points are characterized by a latitude, a longitude and an altitude.

This method therefore makes it possible to determine the start and end points of each segment as well as the altitude of these points. This then makes it possible to simplify the determination of the trajectory of the aircraft during the transitions between segments because, regardless of the types of segments, the transition between two segments is broken down into the approach to a navigation point. The various ways of calculating the 529 potential transition combinations between segments of the Arinc 424 standard are thus reduced to a single case (the approach to an end embodied in a navigation point). A number of algorithms can in addition be put in place to perform a specific transition (anticipation of the turn, exact overflight of the point, overflight of the point with a fixed criterion) in a way that is totally independent of the imperatives of the Arinc 424 standard.

This method therefore makes it possible to improve the reliability of the device for determining transitions and to reduce the development costs of this device.

This method is implemented in a flight management system, or FMS. It can be used in preparing the flight, at the time of the initial determination of the trajectory of the aeroplane according to the flight plan. It can also be used during the flight, for example to update the trajectory following a modification to the flight plan.

Advantageously, the determination step is adapted to determine the position of the start point of a segment, as being the point of the segment situated at a determined altitude. This altitude is determined from an altitude parameter dependent on the segment or on another segment of the flight plan. This is used when the segment makes it possible to reach an altitude, makes it possible to follow a route or a heading, makes it possible to perform a race-track pattern, makes it possible to perform a circular arc between two points or makes it possible to perform a great circle route between two points.

Advantageously, the determination step is adapted to determine the position of the start point of a segment from the position of the end point of the preceding segment. This is used when the segment makes it possible to perform a circular arc between two points, makes it possible to follow a route, makes it possible to reach a point, or makes it possible to follow a heading.

Advantageously, the determination step is adapted to determine the position of the end point of the segment as being the point of the segment situated at a determined altitude. This altitude is determined from an altitude parameter dependent on the segment or on another segment of the flight plan. This is used when the segment makes it possible to perform a circular arc centered on a point and at a determined distance from said point, makes it possible to follow a route on the ground, makes it possible to reach a point, makes it possible to perform a race-track pattern, makes it possible to perform a circular arc between two points or makes it possible to perform a great circle route between two points.

Advantageously, the determination step is adapted to determine the position of the end point of the segment as being the point of the segment situated at a determined distance from the start point of the segment. This is used when the segment makes it possible to follow a route or makes it possible to follow a heading.

Advantageously, the determination step is adapted to determine the position of the end point of a segment as being the point situated at the intersection between the segment and a circle of determined center and of determined radius. This is used when the segment makes it possible to follow a route or makes it possible to follow a heading.

Advantageously, the determination step is adapted to determine the position of the end point of a segment as being the point of the segment closest to a circle of determined center and of determined radius. This is used when the segment makes it possible to follow a route or makes it possible to follow a heading.

In the above two technical features, the values of the center and of the radius of the circle can be contained in a database. The different centers may be beacons or radio transmitters of "DME" type.

Advantageously, the determination step is adapted to determine the position of the end point of a segment from the position of the start point of the next segment. This is used when the segment makes it possible to follow a route or makes it possible to follow a heading.

Advantageously, the determination step is adapted to determine the position of the end point of a segment from at least one chart giving the relationship between the altitude of the end point and the value of at least one of the performance parameters of the aircraft. This is used when the segment makes it possible to follow a route or makes it possible to follow a heading.

The performance parameter of the aircraft makes it possible to determine the climb or descent performance characteristics of the aircraft. The value of this parameter depends in particular on:
- the climb or descent strategy (maximum descent slope, choice of a climb at maximum speed or of an economical climb, choice of a descent with maximum aerodynamic efficiency or of a descent at maximum speed, release or not of the air brakes, etc.),
- the weight of the aircraft,
- the atmospheric conditions, notably the presence and the speed of the wind.

Advantageously, the determination step is adapted to determine a second position of the end point of the segment, this point being the point of the segment situated at a distance that is great relative to the size of the segments of the flight plan. This is used when the segment is a segment in which a pilot determines the instant of the end of the following of the segment.

It is considered that the end point is at a very great distance from the start point when the distance between the start point and the end point is several hundred nautical miles (the nautical mile is a unit of distance measurement used in maritime and air navigation, with a value of 1,852 meters (6076 feet).

BRIEF DESCRIPTION OF THE DRAWING

The invention will be better understood and other advantages will become apparent on reading the detailed description given as a nonlimiting example. This detailed description is provided with the help of the following figures.

DETAILED DESCRIPTION

The processing method is applied to a flight plan comprising at least one segment 201. The method comprises a step for determining the positions of the start point 202 and of the end point 203 of the segments. For this, the method searches for the characteristic points of the segments.

Figure 1:
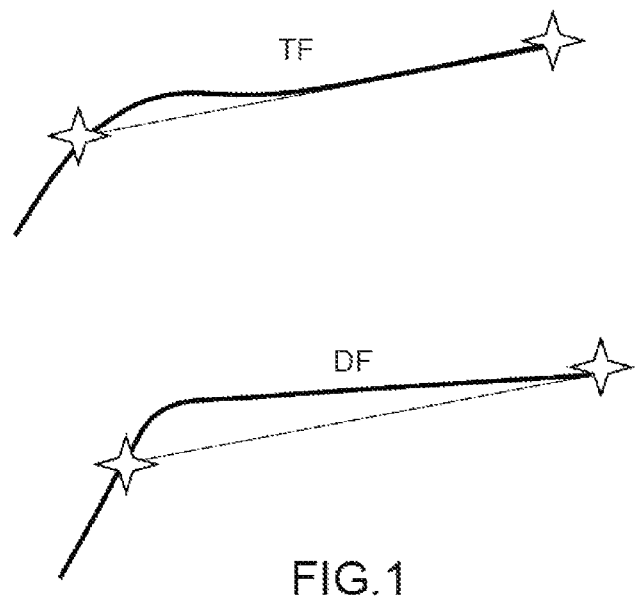
FIG. 1 shows the difference between a segment of TF type and a segment of DF type.
Figure 2:
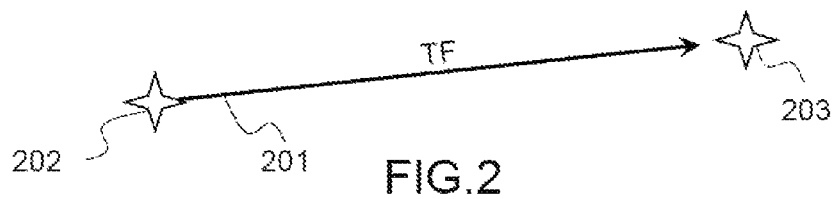
FIG. 2 shows a first variant of the method for processing a flight plan, according to one aspect of the invention.

FIG. 2 shows a first variant of the method. In this variant, the latitude and the longitude of the start 202 and end 203 points are known. It is only necessary to determine the altitudes associated with these two points. These altitudes are determined via an altitude parameter whose value depends on the segment 201, or on an altitude parameter whose value depends on another segment of the flight plan. This parameter is integrated in the navigation system via a human-machine interface or any other device. This variant of the method is used in particular to determine the position of the start point of the segments of FA, FC, FD, FM, HA, HF, HM, IF, PI, RF or TF type and to determine the position of the end point of the segments of AF, CF, DF, HA, HF, HM, IF, RF or TF type.

Figure 3:
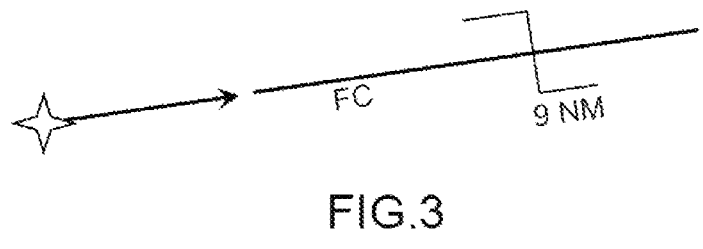
FIG. 3 shows a second variant of the method for processing a flight plan, according to another aspect of the invention.

FIG. 3 shows a second variant of the method. In this variant, the position of the start point of the segment is known. The position of the end point of the segment corresponds to a point of the segment situated at a given distance from the start point. It therefore involves a conventional calculation of great circle or great circle route type. This variant of the method is used in particular to determine the position of the end point of the segments of CD, CR, FC, FD, PI, VD or VR type.

Figure 4A:
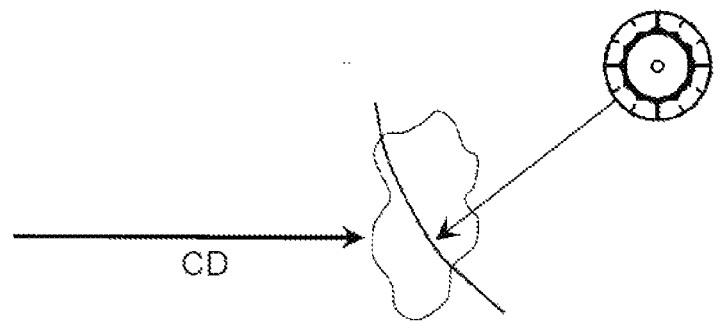
FIGS. 4a and 4b show a third variant of the method for processing a flight plan, according to another aspect of the invention.
Figure 4B:
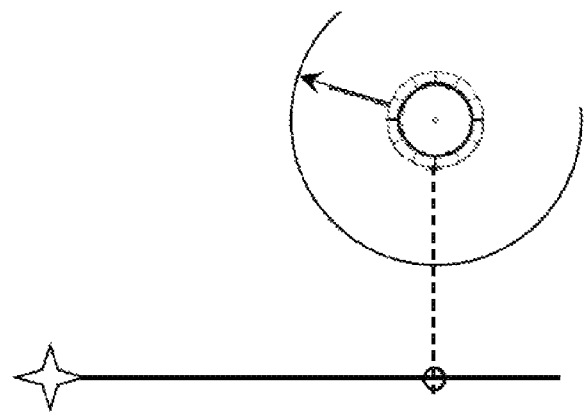

FIGS. 4a and 4b show a third variant of the method. In this variant, the position of the end point is determined as being the point of the segment closest to a circle characterized by its center and its radius. It can in particular be a circle centered on a beacon or radio transmitter of "DME" type. In FIG. 4a, the segment and the circle have a common intersection, the end point is therefore the point at the intersection of the segment and of the circle. This is equivalent to the method known by the acronym PBPD, which stands for "Place Bearing, Place Distance". FIG. 4b shows the case in which the segment and the circle do not have any point of intersection. In this case, the end point is the point of the segment for which the distance from the circle is minimum. These variants of the method are used in particular to determine the position of the end point of the segments of CD, CR, FC, FD, PI, VD or VR type.

Figure 5A:
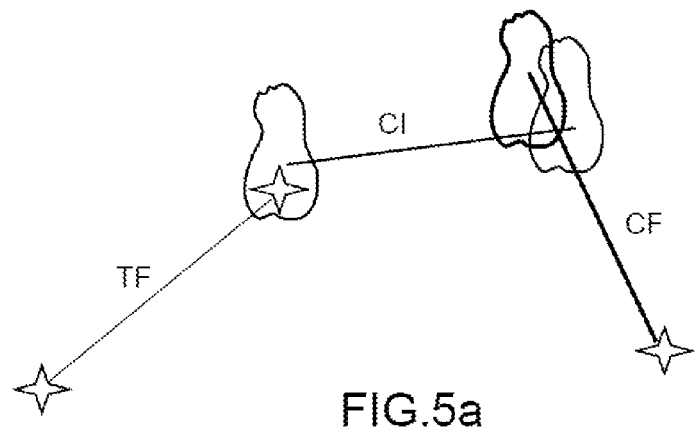
FIGS. 5a and 5b show a fourth variant of the method for processing a flight plan, according to another aspect of the invention.
Figure 5B:
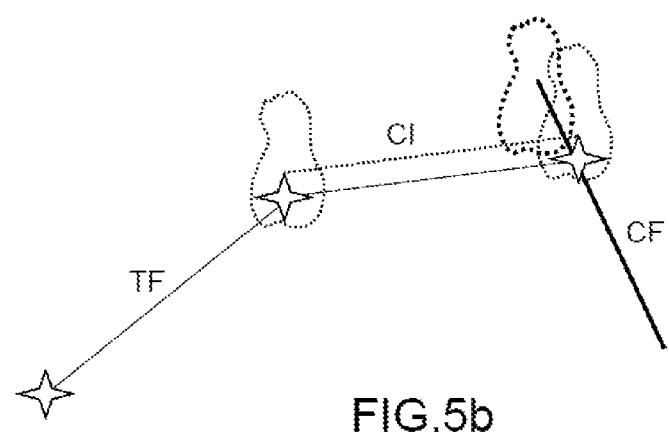

FIGS. 5a and 5b show a fourth variant of the method. In this variant, the flight plan is made up of a set of different segments for which the positions of the start point and of the end point of a segment depend on the other segments. Thus, in FIG. 5a, the flight plan represented is made up of a first segment of TF type, a second segment of CI type and finally a third segment of CF type. The determination of the position of the start point and of the end point of the second segment of CI type and of the start point of the third segment of CF type is thus made. The start point of the second segment of CI type is determined as being the end point of the preceding segment. Since the preceding segment is a segment of TF type, its end point is known. The start point of the second segment of CI type can be determined as being the end point of the first segment of TF type. The determination of the end point of the second segment of CI type depends on the next segment. In fact, the end point of the second segment of CI type corresponds to the start point of the next segment. Since the third segment is of CF type, the determination of its start point is made by geometrical calculation of the intersection of two great circle routes (the first great circle route starting from the start of the segment of CI type, also corresponding to the final point of the segment of TF type and following the route defined by the segment of CI type. The second great circle route starting from the final point of the segment of CF type and following the opposite of the route defined by the segment of CF type). After the start point of the third segment of CF type has been determined, the end point of the second segment of CI type is determined as being the start point of the third segment of CF type. This variant of the method is used in particular to determine the position of the start point of the segments of AF, CA, CD, CI, CR, DF, VA, VD, VI, VM or VR type and to determine the position of the end point of the segments of CI or VI type.

Figure 6A:
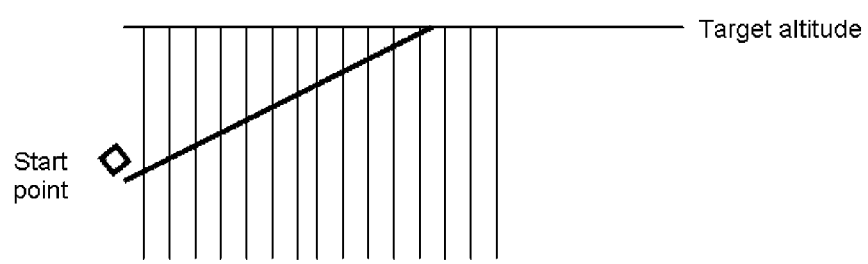
FIGS. 6a and 6b show a fifth variant of the method for processing a flight plan, according to another aspect of the invention.
Figure 6B:
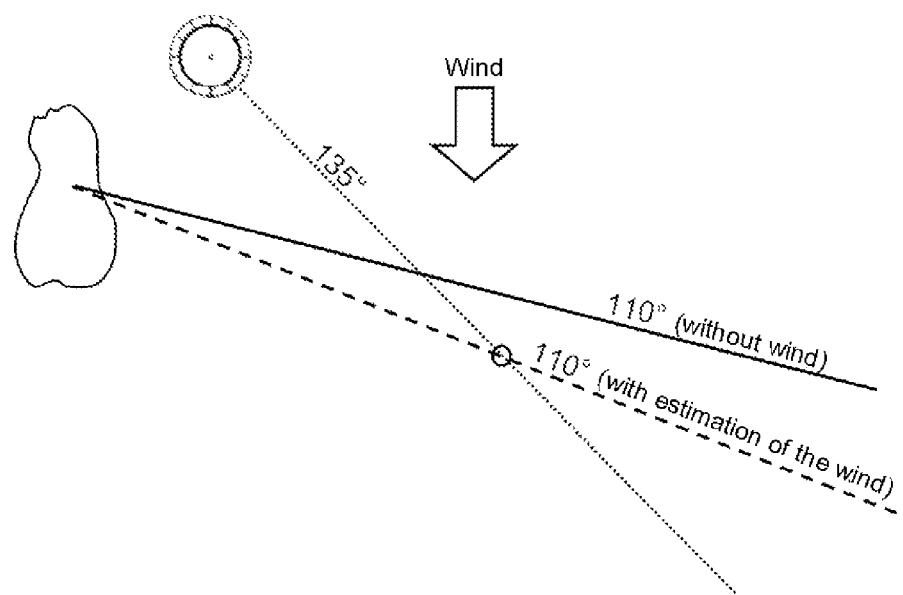

FIGS. 6a and 6b show a fifth variant of the method. This variant is used to determine the position of the end point of a segment, when the position of this end point depends on the aircraft performance characteristics.

This is, for example, the case for a segment of FA type, as represented in FIG. 6a. A segment of FA type corresponds to a segment for which, from a determined start point, the aircraft will follow a climbing or descending route until it reaches a target altitude. To determine the final point of this segment, it is necessary to know the climb or descent performance characteristics of the aircraft which will depend in particular:
  on its climb or descent strategy (maximum descent slope, choice of a climb at maximum speed or of an economical climb, choice of a descent with maximum aerodynamic efficiency or a descent at maximum speed, release or not of the air brakes, etc.)
  on the weight of the aircraft
  on the atmospheric conditions, notably the presence and speed of the wind.

In order to accurately deduce the end point of the segment at which the aircraft reaches the target altitude, it is possible to proceed with a very accurate simulation. However, this simulation requires powerful processors. It is also possible, in order to limit the computation resources needed, to perform this determination of the end point using charts and an average configuration of the aircraft. These charts are determined from databases describing the aircraft performance characteristics. These databases are commonly used by the conventional flight management systems and they accurately describe the instantaneous variations of the different parameters describing the mechanics of the flight of the aircraft. These databases give the trend of these parameters over a limited time interval. In order to obtain this trend over a longer interval, it is necessary, as things stand, to perform a fine integration of the values of these parameters. By contrast, the use of charts makes it possible to determine the trends of the parameters describing the parameters of the mechanics of the flight of aircraft rapidly over a long interval, but this determination is obtained with a lesser accuracy. As an example, to calculate the time needed for a climb from a first altitude to a second altitude, the use of a performance database entails determining the trend capabilities of the slope of the aircraft, then, when the aircraft is in equilibrium, to determine its climb speed as a function of its weight. This then makes it possible to obtain a very accurate value of the time needed for the climb from the first altitude to the second altitude and thus makes it possible to very accurately determine the transition. The use of charts makes it possible to obtain the value of the time needed for a climb from a first altitude to a second altitude for all of the climb. This value is obtained with an accuracy which is sufficient for the rest of the calculations. Furthermore, the use of charts makes it possible to use less powerful processors. A margin is then included by inserting, on either side of the estimation, virtual points, with the same altitude as the target and which are considered to be reached either when the aircraft goes beyond these virtual points, or when the altitude of the virtual point is equal to the altitude of the aircraft. This variant of the method is used in particular to determine the position of the end point of the segments of CA, VA, FA, VD, VI, VM, VR, FM or VM type.

This is also the case for a segment of VR type as represented in FIG. 6b. A segment of VR type is defined by a heading to be followed to the intersection with a specified radial. Now, since a segment of VR type is defined by a heading and not a route to be followed on the ground, its trajectory depends on the wind. This modifies the point of intersection of the heading to be followed with the radial. This influence of the wind is inversely proportional to the speed of the aircraft. In order to determine the position of the end point of a segment of VR type it is therefore necessary to take into account the following parameters:
  the speed and the direction of the aircraft
  the speed and the direction of the wind.

These parameters make it possible to determine a speed vector for the wind and a speed vector for the aircraft in the air. The speed vector of the aircraft relative to the ground is then the sum of the speed vector of the aircraft in the air and of the speed vector of the wind ($\vec{V}_{sol}=\vec{V}_{air}+\vec{V}_{Vent}$). If the speed vector of the aircraft in the air and the speed vector of the wind are constant in space, then the speed vector of the aircraft relative to the ground is also constant in space. The trajectory of the segment is then a rectilinear straight line. The end point of the segment is then the point at the intersection of this rectilinear straight line and of the specified radial. In the case where the speed vector of the aircraft in the air or the speed vector of the wind are not constant in space, it is necessary to break down the space into a set of individual volumes in which the speed vector of the aircraft in the air and the speed vector of the wind are constant. In these individual volumes, it is possible to determine the speed vector of the aircraft relative to the ground and then determine the trajectory of the segment. If, in this individual volume, the trajectory of the segment and the specified radial intercept, then the end point of the segment is situated at this intersection. Otherwise, the same processing operation is carried out in the next volume. The determination of these individual volumes can be made by using forecasts concerning the speed and the direction of the wind obtained, for example, by the aircraft's weather radar. This weather radar also makes it possible to couple each forecast with an indication of accuracy of the forecast. An individual volume is then a volume in which the forecast speed vector of the wind is constant and in which this forecast is considered to be accurate.

Figure 7:
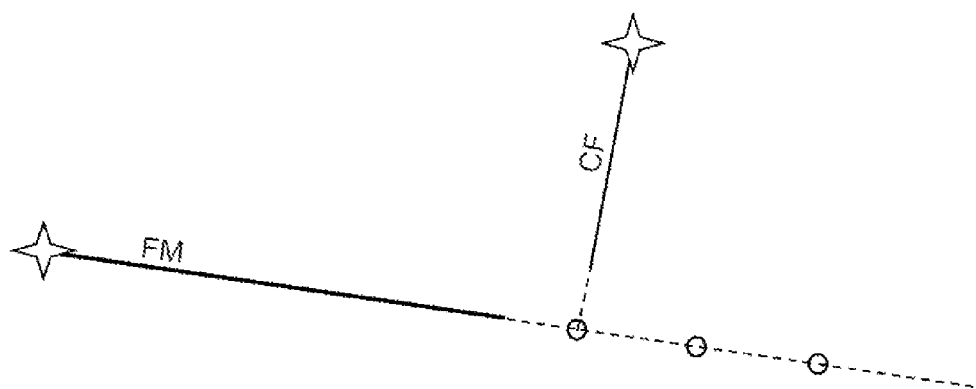
FIG. 7 shows a sixth variant of the method for processing a flight plan, according to another aspect of the invention.

FIG. 7 shows a sixth variant of the method. This variant is, for example, used in the case of a transition between a first segment of FM type and a second segment of CF type. The first segment of FM type has the particular feature of having a termination instant defined by the pilot at the time when this segment is carried out. This termination instant is therefore unknown beforehand. The segments of VM and HM type also have the same particular feature. These segments are used for example in the case where the pilot has to wait for an instruction from the air traffic control authorities before continuing with the flight plan.

In the context of segments of this type, two end points are determined, in order to split the flight plan into a first flight plan in which the end point of the segment of FM type is at the intersection with the segment of CF type or at a determined distance in front of the aircraft and a second flight plan in which the segment of FM type is infinite. The use of these two flight plan assumptions makes it possible to provide the crew with predictions for which the use of fuel is overestimated. If, on approaching the first end point, the pilot still has not indicated the end of the segment of FM type, then the method determines a new position of the first end point by considering that this new end point is on the segment of CF type and at a determined distance in front of the aircraft.

Therefore, the position of a first end point is determined as being the point which is at the intersection between the segment of FM type and the segment of CF type or the point of the segment of FM type which is at a determined distance in form of the aircraft.

Therefore, the position of a second end point is determined in such a way as to conventionally represent a segment of FM type, which is theoretically a "semi-infinite" segment. The concept of "semi-infinite" segment is difficult to implement in computer terms, and it is not realistic because an aircraft cannot make a flight of infinite duration. This is why this end point is considered as being on the segment of FM type and at a very great distance compared to the distances of the other segments, for example a distance of several hundred nautical miles or, more specifically of 200 nautical miles (the nautical mile is a unit of distance measurement used in maritime and air navigation, with a value of 1,852 meters (6076 feet) from the start point.

The invention claimed is:

1. A method implemented in a flight management system for processing a flight plan, the flight plan including a plurality of segments, the method comprises:
    a step of determining with the flight management system positions of a start point and of an end point of each of the plurality of segments constituting said flight plan;
    searching with the flight management system for at least two characteristic points for each of the plurality of segments, said characteristic points being explicit and fixed, said characteristic points comprising a latitude, a longitude and an altitude; and
    determining transitions between each of the plurality of segments with the flight management system based on the step of determining the positions of the start point and of the end point of each of the plurality of segments, the transitions comprising a trajectory element that links two of the plurality of segments together in a flyable manner, the plurality of segments and the transitions constituting said flight plan and said flight plan being executed by the flight management system.

2. The method according to claim 1, in which said determination step determines the position of the start point of one of the plurality of segments as being the point of the one of the plurality of segments situated at an altitude determined from an altitude value imposed at a point of one of the plurality of segments or of another one of the plurality of segments of the flight plan, when said one of the plurality of segments is determined to one of the following: to reach an altitude, to follow a route, to perform a race-track pattern, to perform a circular arc between two points or to perform a great circle route between two points.

3. The method according to claim 1, in which said determination step determines the position of the start point of one of the plurality of segments from the position of the end point of a preceding one of the plurality of segment, when the one of the plurality of segments is determined to one of the following: to perform a circular arc between two points, to follow a route, to reach a point or to follow a heading.

4. The method according to claim 1, in which said determination step determines the position of the end point of one of said plurality of segments as being the point of said one of the plurality of segments situated at an altitude determined from an altitude value imposed at a point of said one of the plurality of segments or of another one of the plurality of segments of the flight plan, when the one of the plurality of segments is determined to one of the following: to perform a circular arc centered on a point and at a determined distance from said point, to follow a route on the ground, to reach a point, to perform a race-track pattern, to perform a circular arc between two points or to perform a great circle route between two points.

5. The method according to claim 1, in which said determination step determines the position of the end point of one of said plurality of segments as being the point of said one of the plurality of segments situated at a determined distance from the start point of said one of the plurality of segments, when the one of the plurality of segments is determined to one of the following: to follow a route or to follow a heading.

6. The method according to claim 1, in which said determination step determines the position of the end point of one of the plurality of segments situated at the intersection between a projection of one of the plurality of segments and a circle having a predetermined center and a predetermined radius when the one of the plurality of segments is determined to one of the following: to follow a route or to follow a heading.

7. The method according to claim 1, in which said determination step determines the position of the end point of one of the plurality of segments to a circle of a predetermined radius when the one of the plurality of segments is determined to one of the following: to follow a route or to follow a heading.

8. The method according to claim 1, in which said determination step determines the position of the end point of one of the plurality of segments from the position of the start point of the next one of the plurality of segments, when the one of the plurality of segments is determined to one of the following: to follow a route or to follow a heading.

9. The method according to claim 1, in which said determination step determines the position of the end point of one of the plurality of segments from at least one chart giving the relationship between the altitude of the end point and the value of at least one of the performance parameters of the aircraft when the one of the plurality of segments is determined to one of the following: to follow a route or to follow a heading.

* * * * *